United States Patent

[11] 3,603,969

| [72] | Inventor | Lamont J. Seitz<br>Tujunga, Calif. |
|---|---|---|
| [21] | Appl. No. | 738,169 |
| [22] | Filed | June 19, 1968 |
| [45] | Patented | Sept. 7, 1971 |
| [73] | Assignee | Baxter Laboratories, Inc.<br>Morton Grove, Ill. |

[54] ELECTRONIC DIGITAL CONVERTER
1 Claim, 2 Drawing Figs.

[52] U.S. Cl. .................................................. 340/347 AD
[51] Int. Cl. ...................................................... H03k 13/20
[50] Field of Search ........................................... 340/347;
331/71

[56] References Cited
UNITED STATES PATENTS
2,824,285  2/1958  Hunt ............................. 340/347
2,963,697  12/1960  Giel .............................. 340/347
3,233,120  2/1966  Darke .......................... 331/71 X OTHER REFERENCES
Barbara W. Stephenson, Analog to Digital Conversion Handbook, 1964, pg. 5-6 Digital Equipment Corp. Maynard, Massachusetts Primary Examiner—Maynard R. Wilbur
Assistant Examiner—Charles D. Miller
Attorneys—Walter C. Kehm and Richard J. Reilly ABSTRACT: A digitizer system and apparatus is provided for use, for example, in conjunction with a spectrophotometer for providing optical transmission readings of a test sample, or for converting optical transmission readings of the test sample into logarithmic readings representative of the optical density of the sample.

ELECTRONIC DIGITAL CONVERTER

The apparatus and system of the invention is similar to that described and claimed in Copending Application 675,165 which was filed Oct. 13, 1967. The system of the present invention, however, includes a memory so that the analog optical density signal from the spectrophotometer may be briefly applied to the system, and the signal need not be continuously applied to the apparatus while the apparatus is undergoing the digitizing process.

BACKGROUND OF THE INVENTION

As is well known, spectrophotometric analysis is a method of chemical analysis based on the absorption of light of a particular wavelength by a particular impurity in the test sample. Instruments used for making these tests are known as spectrophotometers, and these instruments are capable, by selecting different wavelengths of light passed through the test sample, of measuring the percent concentration of various known impurities in the sample. A simple spectrophotometer, for example, comprises a light source and a light dispersing means, so that a selected band of light is directed through the sample. A photodetector is provided for producing an analog electrical signal having an amplitude indicative of the amount of light transmitted by the sample at the selected wavelength. This value is known as the "optical transmission" of the sample. The optical transmission readings are usually converted into a logarithmic scale, by one means or another, so that readings of the "optical density" of the sample may be obtained.

The system and apparatus described in the copending application provides a simple and relatively inexpensive instrument which is capable of responding to the analog output of a spectrophotometer, and of either providing an optical transmission reading, or of converting that output into a logarithmic scale to provide an optical density reading. The instrument described in the copending application includes circuitry for digitizing the analog readings from the spectrophotometer, and for simultaneously converting the readings into the desired logarithmic scale. The instrument also includes a simple counter for providing the optical transmission or optical density readings.

As mentioned above, the system and apparatus of the present invention is similar to that described in the aforesaid copending application. However, the system of the present invention includes a memory means so that the spectrophotometer output need not be coupled to the digitizing system throughout the entire digitizing interval. The circuit and system of the present invention permits, for example, a subsequent sample to be advanced to the spectrophotometer for the next optical transmission reading, while the digitizing operation on the previous sample is actually taking place.

DETAILED DESCRIPTION OF THE ILLUSTRATED EMBODIMENT

Figure 1:
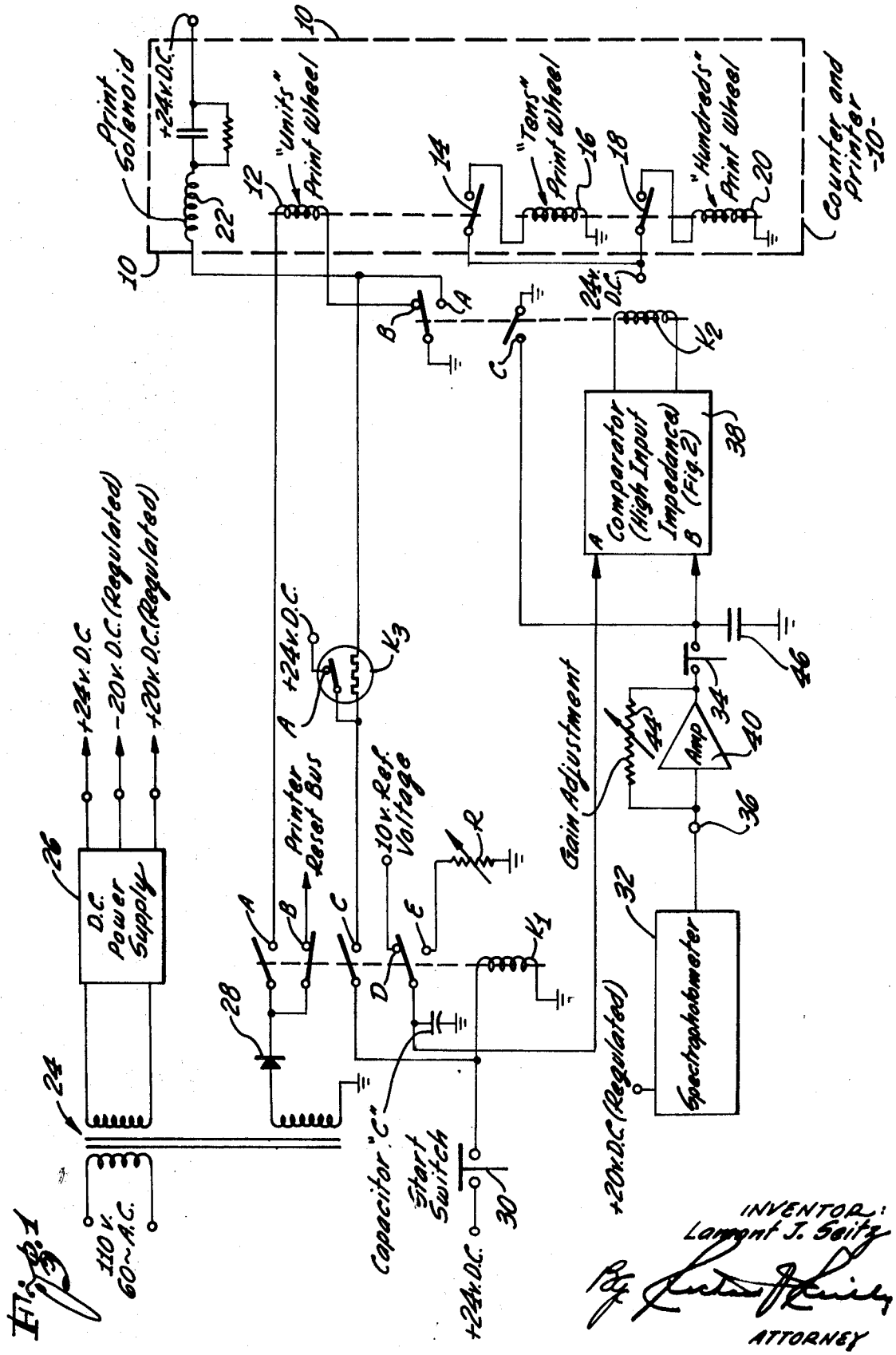
FIG. 1 is a circuit diagram of the system of the present invention, and illustrating a circuit for converting spectrophotometer optical transmission analog into a displayed optical transmission reading, and incorporating the aforesaid memory means.

The system of FIG. 1 may include a counter/printer unit which is designated as 10. This unit, for example, may be of the type manufactured by the Presin Co., Inc. of Bridgeport, Conn. The printer/counter 10, for example, includes a solenoid coil 12 which responds to input pulses to turn a "units" print wheel from one angular position to the next. When the "units" print wheel reaches the "10" position, a switch 14 in the unit is closed, and this a activates a solenoid 16 which, in turn, turns the "tens" print wheel of the unit from one angular position to the next. Likewise, when the "tens" print wheel reaches the "100" position, a switch 18 is closed which energizes a solenoid 20, and the latter solenoid, in turn, turns the "hundreds" print wheel of the printer from one position to the next.

The counter/printer unit 10, therefore, serves to count the incoming pulses, and to provide the total count by turning the printing wheels controlled by the solenoids 12, 16, 20 to corresponding angular positions. The printer also includes a print solenoid 22 which, when activated, causes the information established by the print wheels to be printed on an appropriate tape, as described in the copending application. Resetting means may also be provided which is controlled to return all the print wheels to zero.

In the circuit of FIG. 1, a transformer 24 is provided which has a primary winding connected to the usual 110-volt 60-cycle alternating current mains. A first secondary winding of the transformer 24 energizes a usual direct current power supply 26, so that a 24-volt direct current voltage may be obtained, as well as positive and negative 20-volt direct current regulated voltages. Suitable rectifying circuits for producing these voltages are well known to the art.

At second secondary winding of the transformer 24 is connected through a diode rectifier 28, and through a pair of normally open contacts A of a relay K1 to the aforesaid units print wheel solenoid 12 of the counter/printer 10. The diode rectifier serves effectively to transformer the alternating current appearing across aforesaid secondary winding of the transformer 24 into pulses, and when the contacts A are closed by energizing the relay K1, 60-cycle pulses are applied to the solenoid 12. These pulses cause the "units" print wheel to turn from one angular position to the next for each successive pulse. The pulses are also applied through a pair of normally close contacts B of the relay K1 to a printer reset bus (not shown) in the printer/counter 10. When the pulses are applied to the reset bus, all the print wheels of the printer/counter 10 are returned to zero.

A start switch 30 is provided in the circuit of the energizing coil of the relay K1, and serves to connect the coil between the 24-volt output of the power supply 26 and the common return of the circuit, indicated as ground. When the start switch 30 is closed, the relay K1 is energized. The relay has a pair of normally open holding contacts "C" which are connected through a pair of normally closed contacts "A" of a thermal delay relay K3 to the 24-volt output of the power supply 26. The holding "C" K1 are also connected through the energizing element of the thermal relay K3 to a pair of normally open contacts "A" of a relay K2, and to the print solenoid 22 of the printer/counter 10. The movable contact of the normally open contracts "A" of the relay K2 is grounded. The relay K2 also includes a pair of normally closed contacts "B" which complete a connection from ground to the "units" print wheel solenoid 12 of the printer/counter 10.

When the readout system of FIG. 1 is used in connection with a spectrophotometer, such as represent ed by the block 32 in FIG. 1, the 20-volt regulated direct voltage from the power supply 26 may be used to energize the spectrophotometer. The spectrophotometer, as explained above, develops an analog output voltage when a sample is processed thereby, this voltage being representative, for example, of the optical transmission of the test sample. This voltage is applied to the system of the invention by momentarily closing a push button switch 34, the voltage being applied to an input terminal 36 of the system of FIG. 1.

The system of FIG. 1 includes a comparator 38 which has a pair of input terminals designated A and B. A grounded capacitor C is connected to the input terminal A of the comparator, and this capacitor is also connected to the movable contact of a pair of normally closed contacts D and of a pair of normally open contacts E associated with the relay K1. The normally closed contacts D are connected to a standard reference voltage level of, for example, 10 volts. The contacts E, on the other hand, are connected to an adjustable grounded reference resistor R. When the relay K1 is deenergized, the contacts D connect the capacitor C across the 10-volt reference source, so that the capacitor is charged to a reference level. However, when the relay K1 is energized, the contacts E connect the capacitor across the resistor R, so that the capacitor discharges along its usual exponential curve.

The capacitor C functions as a ramp generator, and it can be replaced by a linear ramp generator of any suitable type, when the system is to be used to provide optical transmission readings.

An amplifier 40, which is hunted by a gain adjustment potentiometer 44 connects the input terminal 36 to the input terminal B of the comparator 38. A memory, in the form of a grounded capacitor 46 is connected to the input terminal B of the comparator.

In the operation of the system of FIG. 1, a "blank" sample, such as pure water is tested first. This sample exhibits, for example, 100 percent optical transmission. The pushbutton switch 34 may be held closed during the processing of the blank sample and the gain of the amplifier 40 is adjusted, by adjusting the potentiometer 44 until the relay K2 becomes energized. At this time, the relay D1 deenergized, and the energizing of the relay K2 by the comparator indicates a comparison between the 100 percent optical transmission analog output from the spectrophotometer and the fully charged 10-volt level of the capacitor C. The gain of the amplifier 40 is then decreased slightly from that point, by an adjustment of the potentiometer 44, until the comparator 38 is not quite tripped and the relay K2 is deenergized.

Then a standard sample, having an optical transmission, for example, of a known percent, which is less than 100 percent is tested. For this test, the switch 34 is momentarily depressed, and this causes K1 close, formed by the capacitor 46 to assume a charge corresponding to the analog output of the spectrophotometer corresponding to the standard sample. Due to the high input impedance to the comparator, there is no appreciable leakage of the capacitor 46 during the digitizing interval.

The start switch 30 is then closed, and this starts the count by the counter/printer 10, by virtue of the closure of the contacts A of the relay K1. Also, the contacts E of the relay K1 close, so that the capacitor C discharges through the resistance R along its exponential path. This discharge of the capacitor C continues until the exponentially decreasing voltage applied to the terminal A of the comparator 38 drops to the analog voltage across the memory capacitor 46, and which is representative of the standard sample reading. When the equality point is reached, the relay K2 is energized, so as to stop the count by opening its contacts B, and by causing the reading then appearing on the print wheels to be recorded, by energizing the print solenoid 22 through its contacts A.

A pair of normally open contacts C may be provided in conjunction with the relay K2, and these may be connected across the memory capacitor 46. Then, when the relay D2 is energized at the termination of the digitizing process, as described above, the contacts C may close to remove the charge from the capacitor 46. HOwever, these contacts C are not absolutely essential, because the capacitor will assume a charge corresponding to the output from amplifier 40 in any event. If the value provided by the counter printer 10 is not equal to the known optical density of the standard sample, the resistance R is adjusted, and successive measurements are made until the printed reading for the standard sample is the same as the known optical density of the sample. The system of the invention is now calibrated and ready for operation.

Then, the test samples may be successively tested by the spectrophotometer 32. In each instance, when a test sample is processed by the spectrophotometer, the switch 34 is momentarily closed so as co establish the capacitor memory 46 at the corresponding analog voltage level. Then, the start switch 30 is momentarily closed to start the digitizing process, and the next sample may be brought into position to be tested by the spectrophotometer while the ungrounded process for the previous sample is taking place. The inclusion of the resistors 46 in the system of FIG. 1, therefore, speeds up the process materially The a series of samples are to be tested. It should be appreciated that the switch 34 may be replaced by a pair of normally closed relay contacts actuated by K1. In this case, the start of the digitizing operation disconnects the amplifier voltage from the capacitor 46 and thus allows the circuitry to remember the input voltage present when the start switch 30 was depressed.

Figure 2:
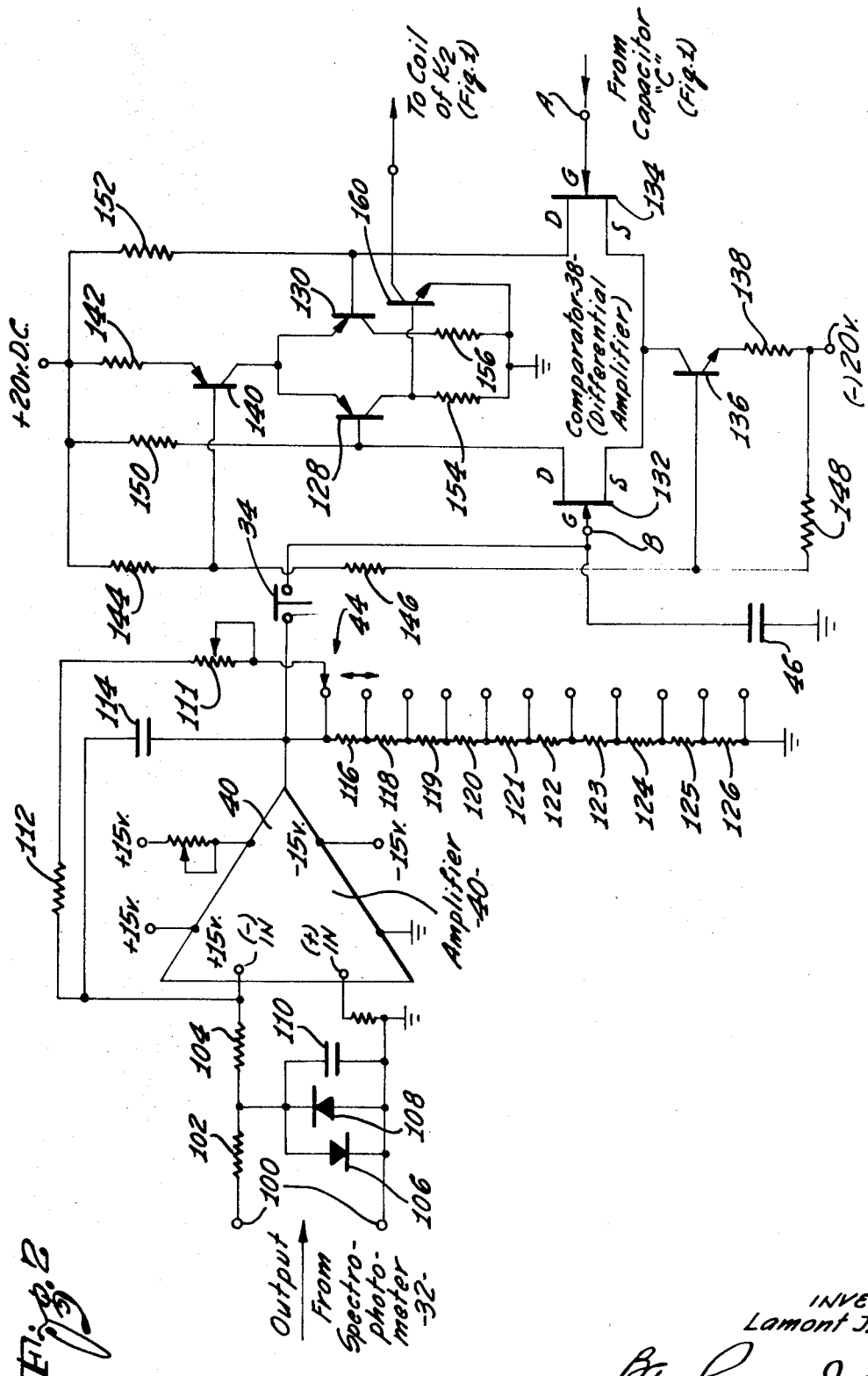
FIG. 2 is a circuit diagram of certain of the components of FIG. 1.

The circuitry for the comparator 38 and its associated components is shown in somewhat more detail in FIG. 2, and this circuitry may be similar to the circuit described in the copending application. As shown in FIG. 2, for example, the amplifier 40 may be of the operational type. The output from the spectrophotometer 32 is applied to a pair of input terminals 100 of the amplifier, one of which is grounded. The ungrounded input terminal 100 of the amplifier is connected through a pair of resistors 102 and 104 to the negative input terminal of the operational amplifier 40. The resistor 102 may, for example, have a resistance of 2.2 kiloohms, and the resistor 104 may have a resistance of 8.2 kiloohms.

The junction of the resistors 102 and 104 is connected to ground through a pair of back-to-back diodes 106 and 108, these being shunted by a 5 microfarad capacitor 110. The resistors 102, 104 and the capacitor 110 form an appropriate 60-cycle filter, so that any 60-cycle interference is kept out of the amplifier circuit. The back-to-back diodes 106 and 108 prevent overload currents from reaching the amplifier 40 and damaging the amplifier.

The gain of the amplifier is set by the gain adjustment potentiometer control 44 described in FIG. 1. The potentiometer control includes a fine potentiometer 11 which may have a resistance, for example, of 500 kiloohms, and which is in series with a 1 megohm resistor 112. The input and output of the operational amplifier is shunted by a 0.002 microfarad capacitor 114.

The potentiometer control also includes a coarse gain adjustment composed, for example, of a series of resistors 116, 118, 119, 120, 121, 122, 123, 124, 125, 126, the latter resistor being grounded. These resistors are selectively switched into the circuit by appropriate switch contacts as shown.

The resistor 116 may have a value, for example, of 1.5 kiloohms; the resistor 118 a value of 1 kiloohm; the resistor 119 a value of 680 ohms; the resistor 120 a value of 470 ohms; the resistor 121 a value of 330 ohms; the resistor 122 a value of 220 ohms; the resistor 123 a value of 160 ohms; the resistor 124 a value of 110 ohms; the resistor 125 a value of 75 ohms; and the resistor 126 a value of 160 ohms.

The output from the amplifier 40, as described in conjunction with the circuit of FIG. 1 is applied to the input terminal B of the comparator 38, whereas the exponentially decreasing curve from the capacitor C of FIG. 1 is applied to the input terminal A.

The comparator 38 in the circuit of FIG. 2 takes the form of a differential amplifier made up of a pair of PNP transistors 128 and 130. The input terminal B of the comparator is connected to the gate of a field effect transistor 132, whereas the input terminal A of the comparator is connected to the gate of a field effect transistor 134. The source electrodes of the field effect transistors are connected to the collector of a current stabilizing NPN transistor 136, the emitter of which is connected through a 3.9 kiloohm resistor 138 to the output 20-of a negative 20-volt regulated direct voltage source. The emitters of the transistors 128 and 130 are connected to the collector of a current stabilizing PNP transistor 140, the emitter of which is connected through a 2.7 kiloohm resistor 142 to the 20-volt regulated terminal of the power supply 26 in FIG. 1.

A string of resistors 144, 146 and 148 having respective values of 4.7 kiloohms, 33 kiloohms and 4.7 kiloohms are connected between the positive and negative outputs of the positive and negative 20-volt sources. The junction of the resistors 144 and 146 is connected to the base of the transistor 140, whereas the junction of the resistors 146 and 148 is connected to the base of the transistor 136. This circuit functions as a current control circuit, so as to assure that invariable currents are used to excite the transistors 128, 130, 132 and 134 in the comparator 38. The field effect transistors 132 and 134 provide a high input impedance to the comparator circuit, so that the loading on the two inputs will be reduced to a negligible level.

The transistors 128 and 130 have their base electrodes connected to the respective drain electrodes of the field effect transistors 132 and 134, and to the output terminal of the positive 20-volt source through respective resistor 150 and 152, each having a resistance, for example, of 15 kiloohms. The collectors of the transistors 128 and 130 are connected to respective grounded resistors 154 and 156. These resistors may each have a value of 10 kiloohms. The collector of the transistor 128 is also connected to the base of an NPN relay drive transistor 160. The collector of the transistor 160 is connected to the energizing coil of relay K2. The emitter of the transistor 160 is grounded.

The field effect transistors 132 and 134 may be included in an integrated circuit of the type presently designated SU2080. The PNP transistors 128, 130 and 140 may be of the type presently designated 2N3638. The relay drive transistor 160 may be of the type presently designated 2N3417, as may the transistor 136.

The circuit of the comparator 38 operates so that an energizing current flows through the transistor 160, when the comparison point between the signals applied to the input terminals A and B is reached. The comparator operates as a usual differential amplifier, and a detailed explanation of its function is deemed to be unnecessary.

The field effect transistors 132 and 134 have a high input impedance, as is well known. The high input impedance of the field effect transistor 132 creates negligible leadage on the capacitor 46, so that the capacitor may serve as a memory for the output from the amplifier 40, for the reasons described above.

It will be appreciated that while a particular embodiment of the system of the present invention has been described, modifications may be made. The following claims are intended to cover all modifications which come within the spirit and scope of the invention.

1. An electronic readout system to be connected to alternating current mains of an established frequency for providing output readings in response to an analog input signal voltage, and which comprises an input circuit for receiving the analog input signal voltage; digitizing circuit means including rectifier means connected to the aforesaid alternating current mains for producing a train of pulses having a frequency corresponding to the frequency of the alternating current from said mains; a pulse-actuated counter means for providing readings corresponding to the counts of said pulses; gate circuit means including relay means interposed between said digitizing circuit means and said counter means for controlling the introduction of said pulses from said digitizing circuit means to said counter means; ramp signal generating means for producing a ramp signal exhibiting an exponential time/amplitude characteristic; start circuit means coupled to said ramp signal generating means for initiating said exponential ramp signal and for simultaneously initiating the application of said pulses from said digitizing circuit means through said gate circuit to said counter means; comparator circuit means coupled to said input circuit and to said exponential ramp signal generating means for providing an output when said exponential ramp signal reaches a predetermined time/amplitude relationship with respect to the analog input signal received by said input circuit; circuit means including second relay means coupling said comparator circuit to said gate circuit to terminate the application of said pulses from said digitizing circuit means to said counter means when said exponential ramp signal reaches said predetermined relationship with respect to said input signal thereby to provide a comparator output; memory means including a capacitor in said input circuit; and means in said input circuit for introducing said received analog input signal voltage to said memory means to cause said memory means to establish an analog voltage corresponding to such input signal voltage and to maintain said voltage after the input signal has been removed.

UNITED STATES PATENT OFFICE
CERTIFICATE OF CORRECTION

Patent No. 3,603,969                    Dated September 7, 1971

Inventor(s) Lamont J. Seitz

It is certified that error appears in the above-identified patent and that said Letters Patent are hereby corrected as shown below:

Column 1, line 75, delete "a" (first occurrence).
Column 2, line 25, change "At" to --A--.
         line 29, change "transformer" to --transform--.
         line 35, change "close" to --closed--.
         line 58, change "represent ed" to --represented--.
Column 3, line 35, change "K1 close," to --the memory--.
         line 60, change "HOwever" to --However--.
         line 72, change "co" to --to--.
Column 4, line 1, change "ungrounded" to --digitizing--.
         line 2, change "resistors" to --memory--.
         line 4, change "The" to --when--.

Signed and sealed this 29th day of February 1972.

(SEAL)
Attest:

EDWARD M. FLETCHER, JR.        ROBERT GOTTSCHALK
Attesting Officer             Commissioner of Patents